United States Patent [19]

Liu

[11] 4,111,689
[45] Sep. 5, 1978

[54] METHOD OF STORING HYDROGEN

[75] Inventor: James Liu, Denver, Colo.

[73] Assignee: Franklin Baumgartner, Denver, Colo.

[21] Appl. No.: 656,402

[22] Filed: Feb. 9, 1976

[51] Int. Cl.$^2$ .................. C22C 30/00; C22C 22/00; C22C 38/12; C22C 38/14
[52] U.S. Cl. ...................................... 75/122; 75/123 J; 75/123 M; 75/123 N; 75/134 F; 75/134 N; 75/134 M
[58] Field of Search ...................... 62/47, 48; 206/0.7; 34/15; 75/175.5 V, 123 W, 123 J, 123 M, 123 N, 134 M, 134 N, 134 V, 134 F, 134 Y; 252/471, 461, 472; 423/248, 644, 648; 429/40, 221

[56] References Cited

U.S. PATENT DOCUMENTS

| | | | |
|---|---|---|---|
| 2,880,089 | 3/1959 | Vordahl | 75/175.5 |
| 3,156,590 | 11/1964 | Vordahl | 75/175.5 X |
| 3,167,159 | 1/1965 | Bovenkerk | 62/48 |
| 3,853,700 | 12/1974 | Armijo | 75/123 M |
| 3,922,872 | 12/1975 | Reilly et al. | 252/471 |
| 4,040,410 | 8/1977 | Libowitz | 423/644 |

Primary Examiner—Arthur J. Steiner
Attorney, Agent, or Firm—Sheridan, Ross, Fields & McIntosh

[57] ABSTRACT

A method of storing hydrogen in which gaseous hydrogen is sorbed in titanium-vanadium-manganese and titanium-vanadium-iron alloys at room temperature and moderate 5 Claims, No Drawings

METHOD OF STORING HYDROGEN

BACKGROUND OF THE INVENTION

The invention lies in the field of methods for storing hydrogen.

Hydrogen gas is used widely as a rocket fuel and in fuel cells. In view of the present fuel shortage, hydrogen is looked upon quite favorably as a potential clean fuel of the future. In view of the present usages and potential used of hydrogen as a fuel, there is a need for a means for storing hydrogen over extended periods of time.

Storage of hydrogen in pressure vessels is not satisfactory because of the danger of fire and explosion. Various metal alloys have been used for the storage of hydrogen through the formation of stable metal hydrides. For examples, alloys for storing hydrogen are disclosed in U.S. Pat. Nos. 3,315,479; 3,375,676; 3,508,414; and 3,516,263. Based on consideration of safety, convenience, and economy, there is a need for improvement in storage methods utilizing alloys, particularly in the areas of the amount of hydrogen which can be stored on the basis of the weight of the alloy, hydrogen concentration in the alloys, the amount of heat and pressure required during storage, rate of release of hydrogen from the alloy used, percentage of hydrogen desorbed from the alloy in which it is stored, and others.

SUMMARY OF THE INVENTION

The invention is an improvement in methods for storing hydrogen in alloys, the improvement comprising contacting alloys of titanium, vanadium and manganese, and titanium, vanadium and iron, at room temperature or lower under pressures up to about 400 psia, The composition of the alloy in weight percentages comprises about 31–46% titanium, about 5–33% vanadium, and about 36–53% of manganese or iron. Possibly a metal complex is formed with the hydrogen, but the exact physical and chemical structure of the complex is not known.

The invention eliminates the need for storage of hydrogen in high pressure vessels as the complex need not be stored in high pressure vessels. After production of the complexes, they can be maintained at room temperature and moderate hydrogen pressures until time for release of the hydrogen for use. Hydrogen can be released from the complex by heating the complex at various temperatures. Up to about 90% of the stored hydrogen can be desorbed economically at a temperature of up to about 340° C.

The alloys used for storing hydrogen in accordance with the invention can be produced by standard alloying procedures. They can be formed by mixing together the proper amounts of titanium and vanadium, and manganese or iron, and melting the mixture followed by cooling the melt. Conventional equipment, in the way of pressure vessels and heating devices, may be used in practicing the invention.

The reaction between hydrogen and the alloys of the invention is exothermic, so that no heat is required during the storage operation. The advantage of this is, of course, that a significant saving can be accomplished over prior art processes using alloys, such as $Mg_2NiH_4$ for example, for storage of hydrogen in that these prior processes normally require a temperature of up to 250° C. during the storage procedure.

In the practice of the invention the alloy in chunks or powder form is introduced into a stainless steel reactor and degassed by evacuating the reactor. Gaseous hydrogen is then introduced into the reactor at a temperature varying from room temperature to about −10° C. or lower. The reaction can be carried out at higher temperatures but the amount of hydrogen sorbed will be correspondingly decreased. The exothermic reaction between hydrogen gas and the alloy begins immediately and it is frequently necessary to remove heat in order for the reaction to proceed to completion. In the experiment carried out for the alloy of Ti-V-Mn, the starting pressure was about 385 psia. Preferably the first batch of hydrogen is added in an amount of about 30% of the total amount which the alloy will sorb. After the introduction of the first batch of hydrogen, the pressure drops to 0 within a few minutes, indicating that hydrogen is readily sorbed by the alloy.

The following examples are illustrative of the invention but not restrictive thereof. The results of the examples are set forth in Table 1 below.

EXAMPLE 1

3.69 grams of an alloy was used in this example containing by weight percent 31.1% titanium, 33.1% vanadium, and 35.7% manganese. Degassing was accomplished as described above and gaseous hydrogen was introduced into the reactor at a temperature of about 20° C. The exothermic reaction began immediately with the evolution of heat and it was necessary to remove heat in order to complete the reaction at this temperature. In a typical experiment hydrogen gas was introduced into the reactor batch-wise. A starting pressure of about 193 psia was used. The pressure within the reactor dropped to 78 psia within 10 minutes, about 90% of the hydrogen content in the alloy being sorbed, indicating that the alloy was readily adsorbing the hydrogen. Results of the example are reported in Table 1 below.

EXAMPLE 2

8.09 grams of an alloy containing by weight percent 42% titanium, 9% vanadium, and 49% manganese was used in the form of big chunks. The reactor was degassed and introduction of hydrogen begun at a pressure of about 215 psia. The exothermic reaction began almost immediately. After the alloy was fully loaded desorption was tested by heating to about 270° C. and permitting the hydrogen gas to expand to an environment of about 3.5 atmospheres. The second desorption test was run at a temperature of about 340° C. with the hydrogen gas expanding to an environment of about 1.4 atmospheres. The results are reported in Table 1 below.

EXAMPLE 3

The sample used in this example contained 10.18 grams of an alloy consisting by weight percent of about 31% titanium, 33% vanadium, and 36% iron. The alloy was degassed and gaseous hydrogen introduced at a temperature of between room temperature and about −10° C. under a starting pressure of 800 psia. Desorption was tested at a temperature of about 210° C. The results of this example are reported in Table 1 below.

EXAMPLE 4

The sample for this example contained 4.73 grams of an alloy consisting by weight percent of about 42% titanium, 8.9% vanadium, and 49% iron. The alloy was degassed in the reactor as explained above and gaseous hydrogen introduced at a starting pressure of about 230 psia. After completion of the exothermic reaction, the desorption was tested by heating the reactor to a temperature of about 190° C. with the hydrogen expanding to an environment of about 2.1 atmospheres of pressure. The results of this experiment are set forth in Table 1 on the following page.

TABLE 1

|  | Example 1 (Ti-V-Mn) | Example 2 (Ti-V-Mn) | Example 3 (Ti-V-Fe) | Example 4 (Ti-V-Fe) |
| --- | --- | --- | --- | --- |
| Weight of Sample (grams) | 3.069 | 8.09 | 10.18 | 4.73 |
| Sorption Temperature (° C) | About room temperature or lower for all examples | | | |
| Sorption Pressure (psia) | 215 | 215 | 803 | 200 |
| Amount of $H_2$ Sorbed (Weight Percent Alloy) | 2.59 | 2.3 | 1.9 | 1.52 |
| Chemical Composition | $TiMnVH_4$ | $(TiMn)_5VH_{13.2}$ | $TiFeVH_{2.95}$ | $(TiFe)_5VH_{8.7}$ |
| Desorption Temperature (° C) | 299 | (1) 271 (2) 340 | 290 | 160 |
| Amount of $H_2$ Evolved (%) at the Corresponding Desorption Temperature | 86.8 | (1) 66.6 (2) 73.7 | 86.1 | 89.7 |

It can be seen from the results of the examples that up to 2.5% of hydrogen based on the total weight of the alloy can be adsorbed and up to 90% of adsorbed hydrogen can be recovered or desorbed from the alloy. Sorption is performed at room temperature with removal of exothermic heat required.

The composition ranges for suitable alloys for the invention based on weight percent are 31–46% titanium, 5–33% vanadium, and 36–53% of either manganese or iron, or mixtures of the latter two metals.

It can be seen from the above that a method has been provided for storing hydrogen in which the necessity for heat during the storage operation is eliminated, effective storage can be accomplished in acceptable amounts, high percentage of the stored hydrogen can be recovered, and the alloy used is relatively inexpensive.

What is claimed is:

1. An alloy for reversibly storing hydrogen which enters into an exothermic reaction with hydrogen to form a complex therewith consisting essentially of about 31–46 weight percent titanium, 5–33 weight percent vanadium and 36–53 weight percent of a metal selected from the group consisting of iron and manganese and mixtures thereof.

2. The alloy of claim 1 consisting essentially of by weight percent about 31.1% titanium, 33.1% vanadium and 35.7% manganese.

3. The alloy of claim 1 consisting essentially of by weight percent about 42% titanium, 9% vanadium, and 49% manganese.

4. The alloy of claim 1 consisting essentially of by weight percent about 31% titanium, 33% vanadium, and 36% iron.

5. The alloy of claim 1 consisting essentially of by weight about 42% titanium, 8.9% vanadium and 49% iron.

* * * * *